United States Patent [19]
Johnston

[11] Patent Number: 5,375,195
[45] Date of Patent: Dec. 20, 1994

[54] METHOD AND APPARATUS FOR GENERATING COMPOSITES OF HUMAN FACES

[76] Inventor: Victor S. Johnston, 4030 Senna Dr., Las Cruces, N. Mex. 88001

[21] Appl. No.: 906,101

[22] Filed: Jun. 29, 1992

[51] Int. Cl.⁵ .............................................. G06K 9/00
[52] U.S. Cl. ..................................................... 395/135
[58] Field of Search ............... 395/135, 155, 161, 133; 345/113, 116; 382/2, 56

[56] References Cited

U.S. PATENT DOCUMENTS

| | | | |
|---|---|---|---|
| 4,179,686 | 12/1979 | Bonicalzi et al. | 340/146.3 AG |
| 4,449,189 | 5/1984 | Feix et al. | 364/515.5 |
| 4,676,753 | 6/1987 | Haggas | 434/155 |
| 4,754,487 | 6/1988 | Newmuis | 382/2 |
| 4,841,575 | 6/1989 | Welsh et al. | 381/36 |
| 4,975,969 | 12/1990 | Tal | 382/2 |
| 5,239,625 | 8/1993 | Bogart et al. | 395/128 |

OTHER PUBLICATIONS

Solso, Robert L., et al., "Prototype Formation of Faces: A Case of Pseudo-Memory" *British Journal of Phychology*, vol. 72, pp. 499–503 (1981).

Miller, Leon K., et al., "Dissociation of Feature vs. Configural Properties in the Discrimination of Faces" *Bulletin of the Psychonomic Soc.* vol. 21 (6) pp. 453–455 (1983).

Neumann, Paul G., "An Attribute Frequency Model for the Abstraction of Prototypes", *Memory & Cognition*, vol. 2 (2) pp. 241–248 (1974).

Travis, John, "Gotcha! Criminal Mugs Captured in Computer Memory" *Science News*, vol. 140 (7), p. 109 (Aug. 1991).

Penry, J., "Photo-Fit" (1974) Abstract.

Davies, et al., "Face Identification–the Influence of Delay upon Accuracy of Photo-Fit Construction" *Journal of Police Science and Admin.* (1978).

Davies, et al., "Remembering Faces–Acknowledging our Limitations" *Forensic Sci. Soc. and Journal of Forensic Sci. Soc.* (1978) Abstract.

Davies, et al., "Face Recall: an Examination of Some Factors Limiting Composite Production Accuracy" (1982).

Holland, H. J., "Adaptation in Natural and Artificial Systems", [textbook] Addison-Wesley Publ. Co., Inc. (1975).

Goldberg, D. E., "Genetic Algorithms in Search, Optimization and Machine Learning" [textbook] (1989).

Caldwell, et al., "Tracking a Criminal Suspect Through Face-Space with a Genetic Algorithm" *Proc of 4th Int'l Conf. on Genetic Algorithms*, U. of Cal (San Diego) (Jul. 13–16, 1991).

*Primary Examiner*—Phu K. Nguyen
*Attorney, Agent, or Firm*—Jeffrey D. Myers; Deborah A. Peacock

[57] ABSTRACT

A method and apparatus for generating a composite of an individual face by an person not skilled in computer use, without need for recalling particular facial characteristics. The invention requires rating of a small number of faces, which are then converted by means of a genetic algorithm to a new set of faces, until the person is satisfied with a particular composite in the set.

44 Claims, 6 Drawing Sheets

Different Representations.

|    | BINARY  | GRAY    | "BIN/GRAY" |
|----|---------|---------|------------|
| 0  | 000 000 | 000 000 | 000 000    |
| 1  | 000 001 | 000 001 | 000 001    |
| 2  | 000 010 | 000 011 | 000 011    |
| 3  | 000 011 | 000 010 | 000 010    |
| 4  | 000 100 | 000 110 | 000 110    |
| 5  | 000 101 | 000 111 | 000 111    |
| 6  | 000 110 | 000 101 | 000 101    |
| 7  | 000 111 | 000 100 | 000 100    |
| 8  | 001 000 | 001 100 | 001 000    |
| 9  | 001 001 | 001 101 | 001 001    |
| 10 | 001 010 | 001 111 | 001 011    |
| 11 | 001 011 | 001 110 | 001 010    |
| 12 | 001 100 | 001 010 | 001 110    |
| 13 | 001 101 | 001 011 | 001 111    |
| 14 | 001 110 | 001 001 | 001 101    |
| 15 | 001 111 | 001 000 | 001 100    |
| 16 | 010 000 | 011 000 | 010 000    |
| 17 | 010 001 | 011 001 | 010 001    |
| 18 | 010 010 | 011 011 | 010 011    |
| 19 | 010 011 | 011 010 | 010 010    |
| 20 | 010 100 | 011 110 | 010 110    |
| 21 | 010 101 | 011 111 | 010 111    |
| 22 | 010 110 | 011 101 | 010 101    |
| 23 | 010 111 | 011 100 | 010 100    |
| 24 | 011 000 | 010 100 | 011 000    |
| 25 | 011 001 | 010 101 | 011 001    |
| 26 | 011 010 | 010 111 | 011 010    |
| 27 | 011 011 | 010 110 | 011 110    |
| 28 | 011 100 | 010 010 | 011 111    |
| 29 | 011 101 | 010 011 | 011 101    |
| 30 | 011 110 | 010 001 | 011 100    |
| 31 | 011 111 | 010 000 | 011 000    |

Figure 5

METHOD AND APPARATUS FOR GENERATING COMPOSITES OF HUMAN FACES

COPYRIGHT

A portion of the disclosure of this patent document contains material which is subject to copyright protection. The owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention (Technical Field)

The present invention relates to a method and apparatus for creating a composite of an individual face without the need for recall of discrete facial parts, through the evaluation of a series of computer-generated facial composites.

2. Background Art:

Humans have excellent facial recognition ability. Age, sex, race, intention, mood and well-being may be determined from the perception of a face. Additionally, humans can recognize and discriminate between an "infinity" of faces seen over a lifetime, while recognizing large numbers of unfamiliar faces after only a short exposure. Unfortunately, humans often have great difficulty recalling facial characteristics in sufficient detail to generate an accurate composite of the individual. As a consequence, current composite-drawing creation procedures, which depend heavily on recall of specific facial features, are not always adequate.

When the nature of the perceiver is fixed, such as when a witness is required to identify a criminal suspect, only the configuration and presentation of the stimulus facial print may be varied to facilitate recognition. To ensure success under these circumstances, the facial stimuli must provide adequate information, without including unnecessary details that can interfere with accurate identification. A body of research has attempted to uncover the important factors governing facial stimuli and methods of presentation that are most compatible with the recognition process. The most systematic studies of facial recognition have been conducted in the field of criminology.

Beyond the use of sketch artists, more empirical approaches have been developed to aid in suspect identification. The first practical aid was developed in Britain, between 1968 and 1974. J. Penry, "Photo-Fit," *Forensic Photography*, vol. 3(7), pp. 4-10 (1974). Termed "PhotoFit," this technique uses over 600 interchangeable photographs of facial parts, picturing five basic features: forehead and hair, eyes and eyebrows, mouth and lips, nose, and chin and cheeks. With additional accessories, such as beards and eyeglasses, combinations can produce approximately fifteen billion different faces. Initially, a kit was developed for full-face views of Caucasian males. Other kits for Afro-Asian males, Caucasian females and for Caucasian male profiles soon followed.

Alternatives to PhotoFit have since been developed. They include the Multiple Image-Maker and Identification Compositor (MIMIC), which uses film strip projections; Identikit, which uses plastic overlays of drawn features to produce a composite resembling a sketch (see Solso et al., "Prototype formation of faces: A case of pseudo-memory," 72 *British J. of Psych* 499-503 (1981)); and Compusketch, a computerized version of the Identikit process available from the Visitex Corporation. U.S. Pat. No. 4,676,753, Identification Kits, to Haggas, discloses an overlay based identification kit similar to Identikit.

The Compusketch software is capable of generating over 85,000 types of eyes alone. With no artistic ability, a trained operator can assemble a likeness 45 to 60 minutes. Because of such advantages, computer-aided sketching is becoming the method of choice for law enforcement agencies.

However, because Of its wide distribution, the PhotoFit system has generated the largest body of research on recognition of composite facial images. One study of PhotoFit compared memory for photographs of faces with memory for PhotoFit facial prints which have noticeable lines around the five component feature groups, reporting that subjects recognize the unlined photographs more easily. The presence of lines appears to impair memory, and random lines have the same effect as the systematic PhotoFit lines. G. M. Davies, H. D. Ellis, and J. W. Shepherd, "Face Identification—the Influence of Delay Upon Accuracy of Photo-Fit Construction," *Journal of Police Science and Administration*, vol. 6(1), pp. 35-42 (1978). Individuals display a high degree of recognition of photographs, but generally describe a human face poorly. At least three sources of distortion arise between viewing a suspect and a PhotoFit construction—"selective encoding of features," assignment to physiognomic type,$\rightleftarrows$ and "subjective overlay due to context"—which contribute to the production of caricatures of a suspect rather than accurate representations. G. M. Davies, J. W. Shepherd, and H. D. Ellis, "Remembering Faces—Acknowledging Our Limitations," *Journal of the Forensic Science Society*, vol. 18, pp. 19-24 (1978).

The need to respond to suggestive stimuli or concentrate on specific facial parts is a failing of all currently used systems of generating facial prints. The introduction of bias is particularly sensitive, since the primary use of these systems is in the law enforcement and legal areas. Ideally, to avoid such bias, an unskilled witness should be able to generate a composite facial stimulus unaided and uninfluenced.

Moreover, humans employ different and multiple methods of facial recognition that involve processing dichotomies that vary between analytical, feature based, and holistic organizational strategies. Existing methods of creating facial composite prints appear to constrain some of these methods of recognition. A major conclusion from cognitive research is that the mechanics of Compusketch and its predecessors, PhotoFit, MIMIC, and Identikit, actually inhibit recognition, by forcing witnesses to employ a specific cognitive strategy; namely, constructing facial prints from isolated feature recall. Since facial recognition appears to also involve holistic processes, the single feature methodology may be inappropriate. Indeed, One study has suggested that the single feature approach may be a more serious source of recognition distortion than interference from an outside source. G. M. Davies and D. Christie, "Face Recall: An Examination of Some Factors Limiting Composite Production Accuracy," *Journal of Applied Psychology*, vol. 67, pp. 103-109 (1982).

Many of the problems and limitations of the existing identification systems may be eliminated by adopting a strategy for generating facial prints that exploits the well developed human skill for facial recognition, rather than individual feature recall. Moreover, the present invention has been designed so that it accommodates a wide variety of individual styles of cognitive processing, using a genetic algorithm to generate composite facial prints, evolving an individual facial print over generations, and using recognition as the single criterion for directing the evolutionary process.

The present invention is not primarily concerned with automated recognition of faces, but rather with permitting unskilled individuals to generate facial composites using a computer. Patent dealing with the former area of endeavor include U.S. Pat. No. 4,975,969, Method and Apparatus for Uniquely Identifying Individuals by Particular Physical Characteristics and Security System Utilizing the Same, to Tal; U.S. Pat. No. 4,841,575, Image Encoding and Synthesis, to Welsh et al.; U.S. Pat. No. 4,754,487, Picture Storage and Retrieval System for Various Limited Storage Mediums, to Newmuis; U.S. Pat. No. 4,449,189, Personal Access Control System Using Speech and Face Recognition, to Feix et al.; U.S. Pat. No. 4,179,686, System for Checking the Authenticity of Identification Papers, to Bonicalzi et al.; and U.K. Patent No. GB 2,231,699 A, Obtaining Information Characterizing a Person or Animal, to Sherman.

The genetic algorithm, first described by in 1975 by J. H. Holland, *Adaptation in Natural and Artificial Systems* (Ann Arbor: University of Michigan Press 1975), is a robust search algorithm based upon the principles of biological evolution. In essence, the genetic algorithm is a simulation of the evolutionary process, and makes use of the powerful operators of "natural" selection, mutation and crossover to evolve a solution to any complex design problem. Unlike other procedures Currently in use, a genetic algorithm is capable of efficiently searching a large sample space of alternative facial composites and of finding a "satisficing" solution in a relatively short period of time. Since such a genetic algorithm procedure can be based on recognition rather than recall, and makes no assumptions concerning the attributes of witnesses or the cognitive strategy they employ, it can find an adequate solution irrespective of these variables.

SUMMARY OF THE INVENTION (DISCLOSURE OF THE INVENTION)

The present invention is of a method and apparatus for creating a satisfactory facial composite of a human face comprising: generating a set of facial composites; identifying a fittest facial composite of the set; combining the fittest facial composite and another facial composite from the set to create an intermediate facial composite; placing the intermediate facial composite in the set; and repeating until the intermediate facial composite is satisfactory.

In the preferred embodiment, generating a set of facial composites comprises randomly generating the set after initially limiting the universe from which the set of facial composites is generated by sex, race, and other identifying characteristics. A set of unique strings of binary digits is randomly generated, each of the strings corresponding to a unique facial composite. Each of the composites is rated by a user on a scale of fitness to an observed human face (or any other desired face, such as a beautiful face). The rating may be performed or supplemented by measuring physiological responses of a user. Combining the fittest facial composite and another facial composite comprises breeding two genotypes corresponding to the fittest facial composite and another facial composite to generate an offspring genotype corresponding to the intermediate facial composite. Breeding two genotypes comprises permitting crossover of genes between the two bred genotypes with a probability of 0.24 and mutation of genes within the two bred genotypes with a probability of 0.05. The invention preferably further comprises permitting the user to prevent further changes to a specified feature of the intermediate composite and to modify a specified feature of the intermediate composite. The intermediate composite is placed in the set only if the fitness of the intermediate composite is greater than the fitness of a least fit facial composite of the set, in which case the least fit facial composite is removed from the set.

The primary object of the invention is to provide a facial composite generator usable by an unskilled individual.

The primary advantage of the present invention is its reliance on recognition rather than recall. If a witness is unable to recognize the observed face then accurate facial feature recall is not possible. However, a witness may recognize an observed face without possessing the ability to recall all, or even some, of the separate features of that face. The invention operates independently of the cognitive strategy employed by the witness. Since the invention does not enforce any particular strategy or rely upon any specific attribute, it allows a witness to pursue an individual approach. Because of the lack of constraints on the witness's processing method, the composites are generated more efficiently and more accurately by the invention than by either the Compusketch method or from the assembly of composite parts. These advantages are independent of the age, gender, hemispheric advantage or cognitive style of the witness.

Another advantage of the present invention is that the self-directed development of a facial print eliminates any biasing influences introduced through a human interview. Unlike other facial print techniques, the invention does not require the use of an extensive set of questions about the observed individual prior to generating the composite. This reduces the possibility that other information, unintentionally provided by the questioner, may bias witnesses in their selection of facial features.

An additional advantage of the present invention follows from the fact that interactions between features and their positions may be a major source of error when features are selected and then position-adjusted in two separate operations. This is the common strategy in current computerized systems. By representing facial variables as genes, both cephalometric and/or soft tissue anthropometric measurements and specific feature elements of the composite may be coded in the same genotype. Witnesses using the invention can therefore evolve both the facial features and their relative positions at the same time, and in context.

Yet another advantage of the present invention is that the use of a common gene code allows additional attributes, such as color, to be added easily in any future development of the invention.

A further advantage of the present invention is that, when used to implement a selection routine for facial identification, the invention provides a selection strategy that performs the double function of generating a composite and a genotype for that composite. This genotype can serve as a code for that individual face, not unlike a fingerprint. These genotypes then become useful codes for comparing composite faces with stored records.

Another advantage of the present invention is that genotypes generated by a number of witnesses may be combined through the invention and used to generate a new facial print. These may be more reliable than single source composite prints.

Additional objects, advantages and novel features of the invention will be set:forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purposes of illustrating a preferred embodiment of the invention and are not to be construed as limiting the invention.

FIG. 5 is a chart illustrating Binary, Gray, and BIN/-GRAY genotype codings;

Figure 1:
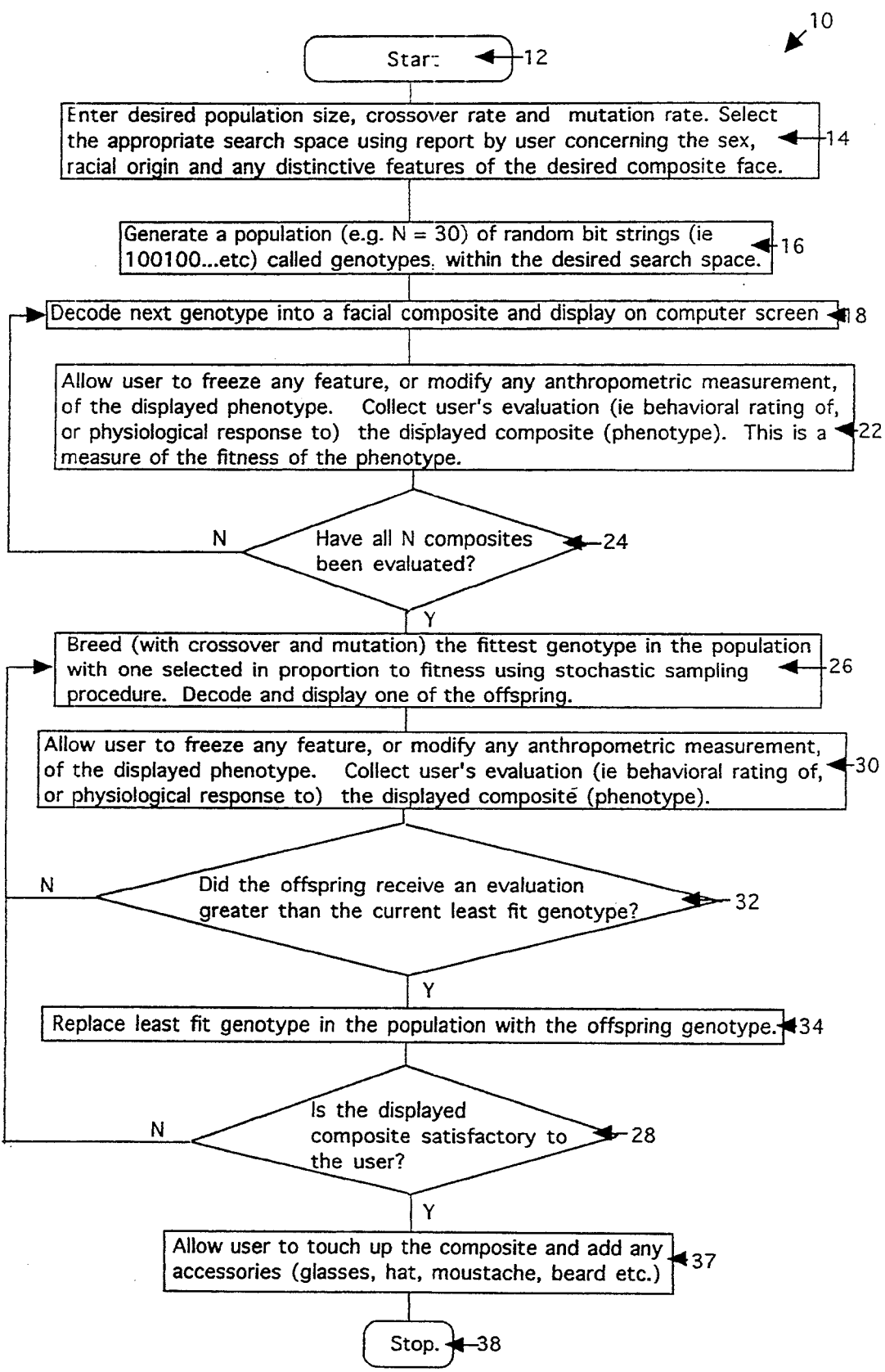
FIG. 1 is a flowchart of the preferred method of the invention.

DESCRIPTION OF THE PREFERRED EMBODIMENTS (BEST MODES FOR CARRYING OUT THE INVENTION)

This invention relates to a computerized method of generating a randomly determined set of facial composite prints, from which an unskilled witness can rate the relative likeness to the observed (or otherwise desired) face on a simple numeric scale, followed by successive generations of computer-generated groups of facial composite prints generated by a genetic algorithm, from which the unskilled witness can continue to rate the likeness, until a satisfactory facial composite is achieved.

A small number (e.g., 30) facial prints (phenotypes) are generated from a random series of binary number strings (genotypes) according to a standard developmental program. During decoding, the first seven bits of the genotype specify the type and position of one of 32 foreheads, the next seven bits specify the eyes and their separation, and the remaining three sets of seven bits designate the shape and position of nose, mouth and chin, respectively. Combinations of these parts and positions allow over 34 billion composite facial prints to be generated. A small number of preliminary questions (e.g., the sex, color, distinctive features, or approximate age of the observed individual) can be initially asked of the witness, and that information used to optimize the 34 billion possibilities to the observed face; i.e., to reduce the size of the "face-space" which must be searched.

The position of all features are referenced to a standard eye-line, defined as an imaginary horizontal line through the center of the pupils. Four positions (2 bits) are used to specify the vertical location of each feature (eyes, mouth, nose and chin) with reference to this standard, and two bits to specify pupil separation. These positions cover the range of variability found in a sample population. The number of bits used to specify features or position can be increased if necessary.

The initial thirty random facial prints can be viewed as single points spread throughout the 34 billion point multi-dimensional "face-space". The function of the genetic algorithm is to search this hyperspace and find the best possible composite in the shortest possible time. The first step in the genetic algorithm is the "selection of the fittest" from the first generation of facial composites. This is achieved by having the witness view all thirty facial composite prints, one at a time, and rate each print on a nine-point scale, according to any resemblance whatsoever to the observed face (a high rating signifies a good resemblance to the observed face). This measure does not depend upon the identification of any specific features shared by the observed face and the facial print; the witness need not be aware of why any perceived resemblance exists.

After ratings of fitness are made by the witness, a selection operator assigns genotype strings for breeding the next generation, in proportion to these measures. Selection according to phenotypic fitness is achieved using a "spinning wheel" algorithm. The fitness ratings of all thirty facial composites are added together (TotalFit) and this number specifies the circumference of an imaginary spinning wheel, with each facial composite spanning a segment of the circumference, proportional to its fitness. Spinning a random pointer (i.e., selecting a random number between one and TotalFit) identifies a location on the wheel corresponding to one of the thirty composites. The fittest face and one selected in proportion to fitness are bred together.

Ratings may be made by measuring physiological responses of a user, e.g., galvanic skin response on P3 component of Event Related Potential, either in addition to or as a substitute for the behavioral rating. This will permit a composite to be generated by a young child or others in which an emotional response conveys useful information.

Breeding involves two operators: Crossover and Mutation. When any two genotypes mate, they exchange portions of their bit strings according to a user specified crossover rate (Xrate=number of crosses per 1000), and mutate (1 to 0, or 0 to 1) according to a user specified mutation rate(Mrate=number of mutations per 1000). For example, two selected genotypes (A and B) for breeding may be represented as shown below.

| A | 1,0,0,0,1,1,0,0,1,0,1,0,1,1,1, . . . 1 |

-continued

| | |
|---|---|
| B | 0,1,1,0,0,0,1,0,1,1,1,0,0,0,0, . . . 0 |

During breeding the first bit of A is read into newA and the first bit of B into newB. At this point a check is made, to see if a crossover should occur.. A random number between 1 and 1000 is generated. If the number is larger than the crossover rate then reading continues with the second bit of A being entered into newA, and the second bit of B into newB and again checking for a random number less than the crossover rate. If a random number less than the selected crossover rate is encountered (after bit 5 for example), then the contents of newA and newB are switched at this point, and filing newA from A and news from B continues as before. If these are the only crossovers executed, then the newA and news will now be:

| | |
|---|---|
| newA | 0,1,1,0,0,1,0,0,1,0,1,0,1,1,1, . . . 1 |
| newB | 1,0,0,0,1,0,1,0,1,1,1,0,0,0,0, . . . 0 |

Exchanging string segments in this manner breeds new designs using the best partial solutions from the previous generation.

When a bit mutates, it changes (1 to 0) or (0 to 1). As each bit of strings A and B are examined, a mutation is implemented if a second random number (between 1 and 1000) is less than the mutation rate. Mutations provide a means for exploring local regions of the gene hyperspace in the vicinity of the fittest facial composites. To accelerate the process of generating the new generation, the mutation operator may be combined with the crossover operator into a single breed function. Following selection, crossover and mutation, a random one of the offspring is developed and rated by the witness as before. If the fitness of the offspring is greater than the current least fit genotype in the population, then the genotype of the offspring replaces the least fit genotype. Two new breeders are then selected and the procedure continues until a satisfactory composite has been evolved.

FIG. 1 presents a flowchart of the preferred method 10 of the invention. Upon start 12 of the process, initialization 14 occurs, comprising entering desired crossover and mutation rates and selection of an appropriate "face space" based on gender, racial origin, and distinctive features of the target face. An initial generation of size N is then randomly generated 16. The first of the initial generation is randomly selected as the initial best composite and its phenotype is displayed on the screen 18. Until all N composites are rated 24, phenotypes are displayed on the screen and the user may freeze any feature or modify any feature and assigns a degree of fitness to the phenotype 22. The highest rated phenotype is then bred with one selected in proportion to fitness and one of the offspring displayed and rated 26. The user then may freeze or modify features of the offspring and rates it 30. If the offspring receives an evaluation greater than the current least fit genotype 32, the offspring replaces the least fit 34. If the user is satisfied 28 with the offspring, the process is ended 38 after the user is permitted to touch up the composite and add accessories 37. If the user is not satisfied, two new breeders are selected as before and bred with a crossover and mutation function applied to them 26 until the user is satisfied 28.

Figure 3:
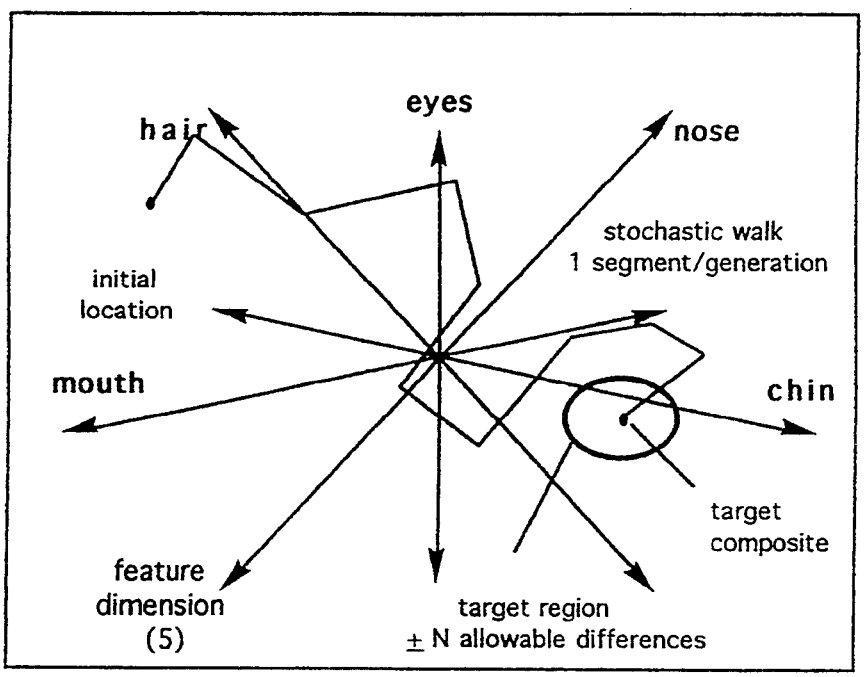
FIG. 3 is a graph of an example stochastic walk through a five-dimensional face space.

The genetic algorithm provides a unique search strategy that quickly finds the most "fit" outcome from a choice of evolutionary paths through the "facespace". FIG. 3 illustrates a stochastic walk over ten generations through face space. The strength of the genetic algorithm lies in (a) the implicit parallelism of the search along all relevant dimensions of the problem, (b) the exponential increase in any partial solution which is above average fitness, over generations, and (c) the exploration of small variations around partial solutions. D. E. Goldberg, *Genetic Algorithms in Search, Optimization and Machine Learning* (Massachusetts: Addison-Wesley 1989). Beginning with a set of points that are randomly distributed throughout the hyperspace, the selection procedure causes the points to migrate through the space, over generations. The efficiency of the migration is greatly enhanced by the sharing of partial solutions (i.e., best points along particular dimensions) through crossover, and the continual exploration of small variations of these partial solutions, using mutations. The result is not a "random walk" but rather, it is a highly directed, efficient, and effective search algorithm.

The optimal crossover and mutation rates for the genetic algorithm were established by use of a second genetic algorithm (meta-level genetic algorithm), with binary, meta-level strings, coded for the crossover and mutation rates. The optimal crossover rate has been found to be 0.24 and the optimal mutation rate 0.05. Use of these rates increases..the accuracy of the generated composites and reduces the overall time required to achieve a satisfactory result.

When witnesses rate any composite, they are permitted to lock one or more features of this composite (hair, eyes, nose, mouth or chin) with a "freeze" option. That section of the 35-bit string corresponding to the locked feature is then inserted into all of the genotypes of that generation, before breeding. That feature cannot then be modified by the cross-over operator or by mutation.

The "freeze" option substantially improves performance, allowing a substantial likeness to the observed face to be achieved after only 10 generations. It is possible to find a single, almost perfect composite (out of 34 billion) by rating only 200 composites (less than 0.000,000,6%).

Figure 2:
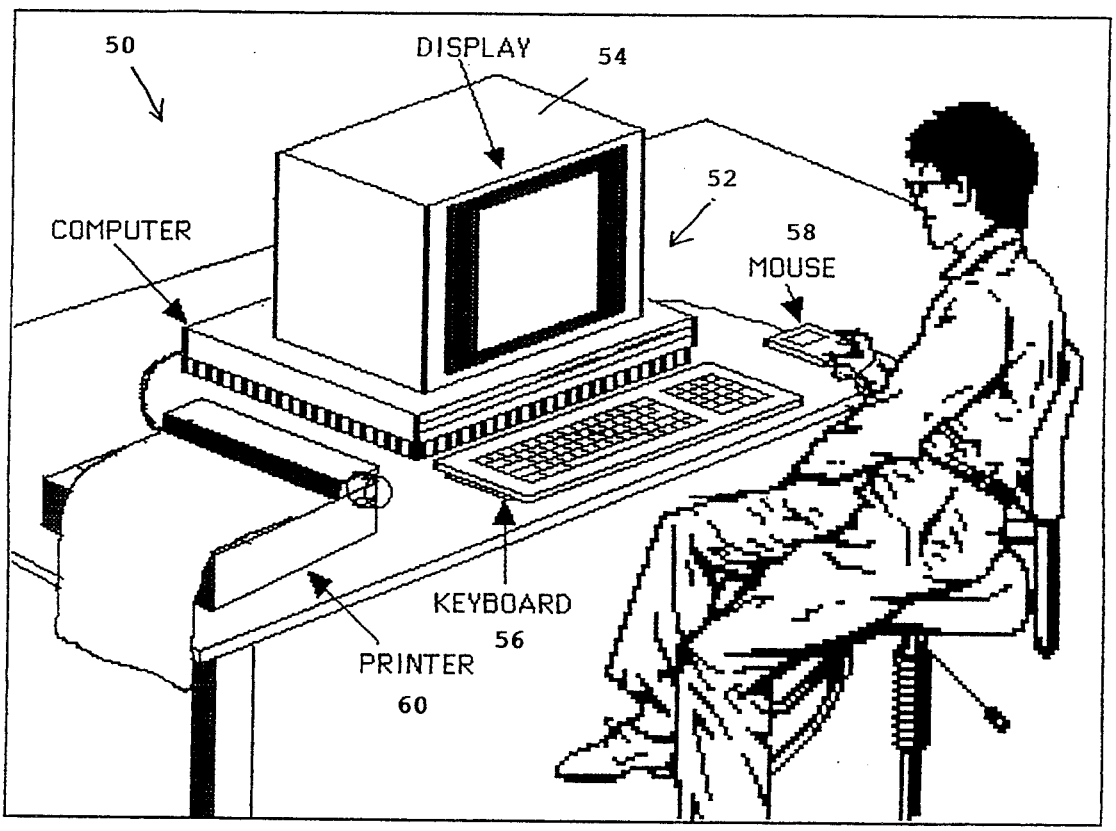
FIG. 2 is an illustration of the preferred apparatus of the invention.

The invention, in its preferred embodiment, can be implemented using current computer technology and used by untrained witnesses, producing a successful compilation in less than one hour. No artistic ability or computer expertise in necessary to generate a composite. FIG. 2 illustrates the preferred apparatus of the invention 50, comprising general purpose computer 52, display screen 54, input devices 56 and 58, and hard copy output device 60.

In the Examples described below, the apparatus of the invention employed was an Apple Macintosh microcomputer operating under software embodying the method of the invention.

While the method and apparatus of the invention fits most naturally for use by eyewitnesses to crimes to generate a composite image of the criminal, the invention is useful in a wide variety of applications. For instance, it may be used to create composite images of the faces of acquaintances. Alternatively, a face considered extremely beautiful or ugly may be generated by ranking generated phenotypes not for fitness to a known face but on a scale of beauty (or ugliness).

Industrial Applicability

The invention is further illustrated by the following non-limiting examples.

EXAMPLE 1

A simulated witness program (SAM) was developed to facilitate the development and testing of the present invention. SAM was designed to simulate a "perfect" witness who could accurately rate each generated facial composite according to its phenotypic distance (resemblance) from the culprit. SAM made it possible to evaluate each design modification of the method of the present invention over hundreds of experimental runs.

Figure 4:
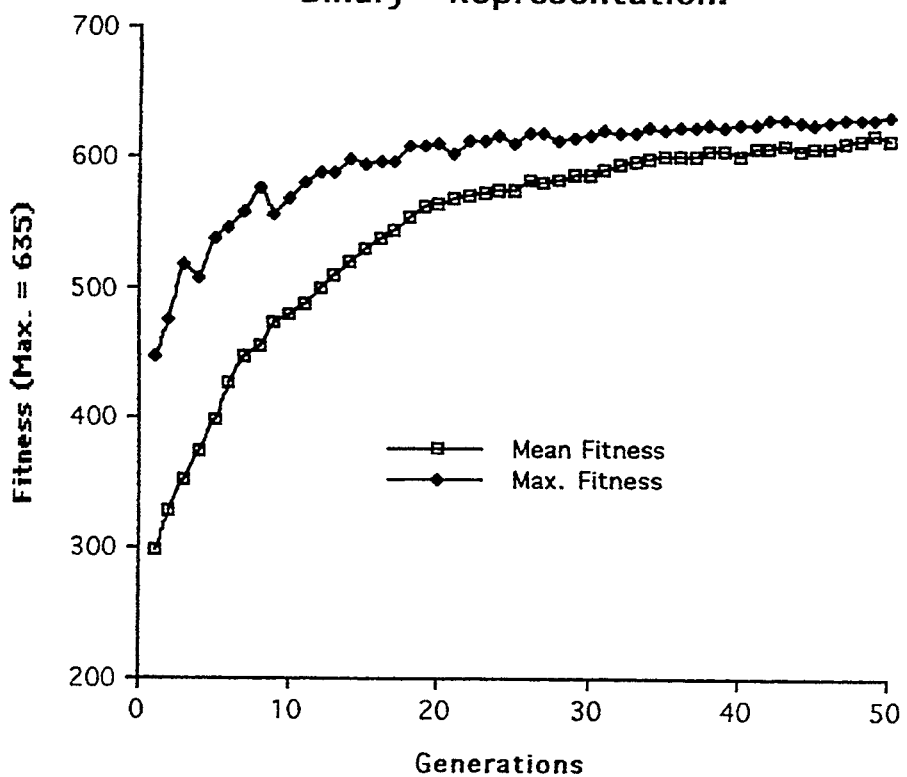
FIG. 4 is a graph of mean and maximum fitnesses over generations of composites.

First, a Stochastic Universal Sampling procedure (SUS) was incorporated into the invention. FIG. 4 shows the improvement of a facial composite (fitness) over 50 generations, using SUS and the simulated witness. Both the average fitness of the population (mean fitness) and the fitness of the best composite (max. fitness) are shown. There were 20 composites per generation. SAM had evaluated only 400 composites out of 34,359,738,368 possible composites (0.0001%), by generation 20. A real witness would require about 1 hour to make these evaluations. Since one hour and 400 evaluations are about the maximum values we could reasonably expect from a real witness, the performance after 20 generations (G20 performance) has been used as a benchmark. In FIG. 4, the maximum possible fitness (perfect composite) is 635. The mean G20 performance is therefore 560/635; 88% of the maximum possible fitness—the best G20 performance is 610/635; 96% of maximum.

EXAMPLE 2

Next, a Gray Code and Binary Code evaluation was performed. Referring to FIG. 5, a potential problem with binary code can be seen when moving from decimal 3 (binary 011) to decimal 4 (binary 100). If decimal 4 is a fit phenotype then decimal 3 also has high fitness. However, at the level of the genotype (binary) it requires three simultaneous bit mutations to move from 011 to 100. This "hamming distance" can be reduced by using Gray code, where a single mutation is all that is required to move from any integer value to the next higher or lower decimal equivalent.

Figure 6:
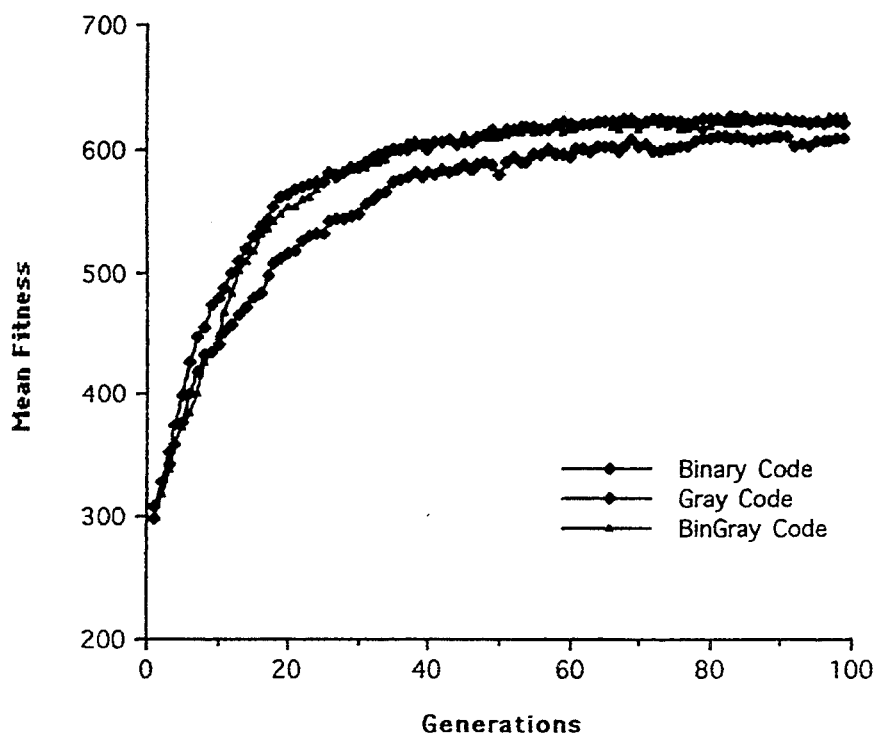
FIG. 6 is a graph of mean fitnesses over generations for the codings of FIG. 5.

FIG. 6, shows the effects of Binary and Gray code on genetic algorithm performance using SAM. Over multiple simulations, the G20 performance of binary(88.6%) was always superior to Gray (81.1%). The problem with Gray appears to be the inconsistent interpretation of the most significant bits. A new code (BinGray in FIG. 5) was tested, which uses binary for the most significant bite and Gray for the least significant bate The average G20 performance of BinGray was 87.1%. At present, binary coded genotypes appear to be superior.

EXAMPLE 3

Next, the user interface of the program was evaluated to determine if the implementation was sufficiently fast for practical use, and to examine the effect a of presenting the best facial composite from the previous generation to a witness rating the current generation.

Subjects. The subjects were 40 undergraduate student volunteers (20 male and 20 female) who were randomly assigned to the two experimental groups. Subjects in Group N (10 males and 10 females) did not have the best composite from the previous generation available when rating the current generation. Group C (10 males and 10 females) subjects were provided with their best prior composite (displayed on the right side of the computer screen) while rating the current generation of faces.

Apparatus. A HyperTalk program was used in this experiment. This version of the software generated an initial set of twenty random bit strings (genotypes), each string being 35 bits long. The 20 strings were decoded into facial composites (phenotypes) using seven bits to specify each facial feature (hair, eyes, nose, mouth and chin) and its position relative to a fixed eye line. (The eye position bits specified the distance between the eyes). The 35 bit code had the potential to generate over 34 billion unique composites.

Each new generation of faces was produced by breeding together the highest rated faces from the previous generation, using Stochastic Universal Sampling and the optimal crossover and mutation parameters derived from a meta-level analysis.

Procedure. Each subject was exposed to a ten second display of a standard culprit's face. Immediately following this display they used the program to evolve a facial composite of the culprit. The subjects were told to (a) rate each of the first generation of faces, on a 9 point scale (fitness), according to its perceived resemblance to the culprit, (b) wait until a new generation of faces was generated by the computer program, (c) rate each of the new generation faces, and (d) repeat steps (b) and (c) until a one hour experimental session was completed. The subjects in Group C were informed that after the first generation the most highly rated composite from the previous generation would be displayed as a reference, while they viewed the new generation of faces. They were instructed to consider this composite as having a value of 5 on the 9 point rating scale, and to rate a current composite as higher than a 5 only if it had a closer resemblance to the culprit than this reference face.

Results. There was a wide variation in performance between subjects. The number of generations completed within the one hour session varied from 7 to 12. For the purpose of data analysis, the generation 7 composite (G7) was examined for all 40 subjects. Two measures of the quality of G7 were used; a "subjective" and an "objective" measure.

The "subjective" measure was obtained by having 12 naive raters (6 male and 6 female) examine the G7 composites of all 40 subjects and rank them for degree of resemblance to the culprit. An analysis of G7 composites revealed no significant difference in quality between the two treatment groups.

The "objective" measure of quality was computed as the phenotypic distance, in the data base, of the G7 composite from the culprit. That is, (hair distance+eye distance+nose distance+mouth distance+chin distance) divided by 5. If the G7 hair was correct, then the hair distance would be zero; if the G7 hair was one above or below the culprit's hair in the data base order, then the hair distance would be 1. (This phenotypic distance is the same measure used by the simulated witness as discussed in the previous report).

Discussion. The purpose of the pilot study was (a) to evaluate the gains or losses associated with presenting the prior generation best composite during the rating of the current generation and (b) to test the user interface of the program.

No significant differences in the quality of the final G7 composite were obtained during the two experimental procedures. However, subjects using a reference composite did show a more systematic improvement in all features over generations; all regression line slopes are negative in value. This parallel improvement in all features is the major strength of the present invention. It is also clear from the slope of the regression lines that some features (e.g., chin-slope= −3.57) were being selected more than other features (e.g., nose-slope= −0.67). This suggests that some facial features may be generally more important than others in determining the degree of similarity between two faces.

The user interface was satisfactory, with the following exceptions. Some subjects found it difficulty to use the computer mouse to click on the rating scale. Consequently, keyboard function keys (F1 to F9) were implemented as an alternative way to input ratings. In addition, subjects were frustrated by the delay between generations (almost 3 minutes) and the inability to "keep" what they perceived to be a good composite. They often complained that good features were lost between generations. The next example outlines the modifications to the program in order to overcome these difficulties.

EXAMPLE 4

The program embodying the method of the invention was subsequently rewritten in SuperTalk, a commercial application program designed as an improvement to HyperTalk. Implementation in SuperTalk reduced the inter-generation time from 3 minutes to 18 seconds. At the same time, the computer interface was redesigned to permit keyboard inputs for all operator controls. Audio signals and flashing buttons were added to prompt the user in the event of a long delay in any input response.

Based on the pilot study findings, the best composite from the prior generation was concurrently displayed while subjects rated the composites of each successive generation. Comments from the subjects on the use of the prior composite suggested additional options which could enhance the effectiveness of the FacePrints process (the present invention) and, at the same time, overcome the subjects' reported frustration in the loss of good features between generations.

Flood Option: When subjects rated any generation of (20) composites, the highest rated composite from that generation was displayed in a window of the computer screen. Before breeding the next generation, subjects were now permitted to lock one or more features of this composite (hair, eyes, nose, mouth or chin). That section of the 35 bit string corresponding to the locked feature was then inserted into all the genotypes of that generation, before breeding. Since all genotypes were then identical at the location of the locked feature, the cross-over operator could not modify that feature in the next generation of faces. (There is still a small probability of modification by mutation).

Freeze Option: A variation of the above procedure, the Freeze option, was implemented in a similar manner, but now the locked feature was also protected from mutations.

Figure 7:
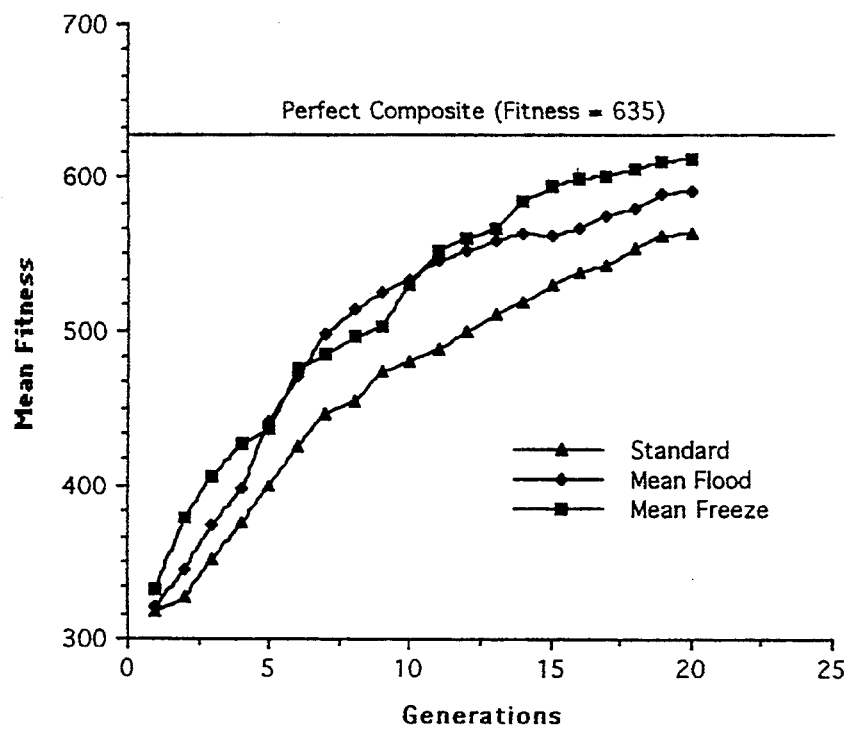
FIG. 7 is a graph of mean fitnesses over generations for standard, flood, and freeze embodiments of the invention.

Evaluating Flood and Freeze Options. In order to evaluate both of these locking procedures, it was first necessary to evolve the optimal cross-over and mutation parameters for each technique. Results obtained from running the meta-level program (see above) revealed that the optimal probability of a crossover was 0.24 for both options, but the optimal mutation probability was 0.03 for the Flood option and 0.05 for the Freeze option. The simulated operator program (SAM) was used to compare the expected performance of FacePrints with and without these two options. FIG. 7 shows the results of this analysis. The G20 performance revealed that both the Freeze and Flood options produced a marked improvement in the performance of the algorithm (Standard G20=88.6%, Flood G20=93.1%, Freeze G20=96.4%)- The superior performance of Freezing over Flooding probably resulted from the harmful effects of mutations as composites began to converge to the likeness of the culprit. Mutations in early generations may have enhanced performance (by exploring more areas of the data base), but in later generations these mutations have a higher probability of being destructive.

Figure 8:
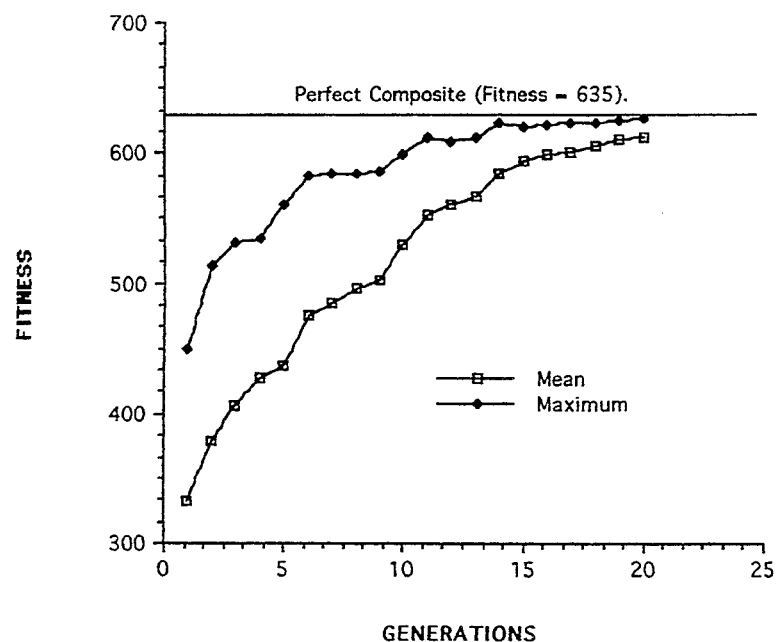
FIG. 8 is a graph of mean and maximum fitnesses over generations using freeze.

FIG. 8 shows the mean fitness of the population and the fittest composite within each generation (maximum), using the Freeze option. The mean and maximum performance at generation 10 and 20 were: G10 =83.3, 94.3; G20=96.4, 98.6, respectively. These results suggest that a substantial likeness to the culprit can be achieved after only 10 generations, if the behavior of a real witness approximates the behavior of the simulated witness. This is a very encouraging result since it establishes that in theory it is possible to find a single almost perfect composite (out of 34 billion) by rating only 200 composites (less than 0.000,000,6%). for this reason, the Freeze option has been included in the preferred embodiment.

EXAMPLE 5

The program embodying the method of the invention was expanded to include new features ("eyebrows" and "position of eyebrows") and allow accessories (beards, moustaches, eyeglasses, and hats) to be added to any facial composite. The number of bits in the genotype was increased to 66, allowing more than 73 billion, billion ($2^{66}$) different composites to be generated. The efficiency of the search was increased by the following modifications.

Figure 9:
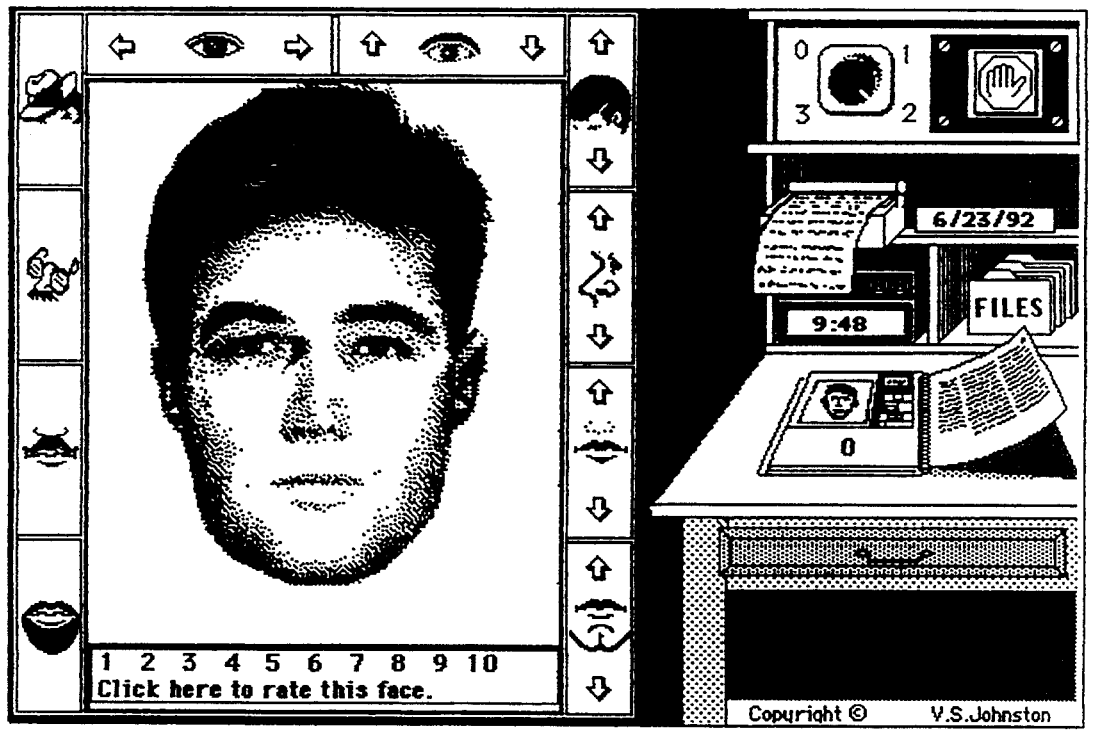
FIG. 9 illustrates a display screen generated by the preferred method and apparatus of the invention.

1. The user was permitted to freeze any feature on any displayed composite during the genetic algorithm search process. This is implemented by clicking on feature icons (or keyboard equivalents) while any phenotype is being displayed (see FIG. 9). The consequence of this is to spread the genotype fragment corresponding to the selected feature throughout the entire population of genotypes.
2. The user was permitted to move any feature during the search process. This is implemented using arrow keys (see FIG. 9) and the consequence is to change the segment of the genotype of the displayed face to a new value.
3. The user was permitted the option of generating a crude composite of the desired face prior to the search algorithm. This was implemented by allowing the user to select between a small number of feature types which were spaced throughout the feature data bases. The spacing distance (S) is a variable of the program which may be given a value between 1 and. X, where X is the number of examples of any feature in the data base. The features of the crude composite may be used to narrow the search space from which the initial random population is generated.

4. The genetic algorithm was modified so that after the first generation, the best composite was mated with a second composite, selected in proportion to fitness, and one of the two offspring of this mating were then presented to the user for immediate evaluation. If it exceeded the rating of the currently lowest rated composite, then the latter was replaced by the new genotype and the process was repeated. This procedure reduced the computation time between generations and allowed the program to run efficiently in HyperTalk rather than SuperTalk. The procedure also eliminated the necessity for displaying the prior best composite, on the other side of the screen, as was the case in the prior versions of FacePrints.

EXAMPLE 6

Based on the data obtained from the current sample of subjects and culprits under laboratory conditions, the best estimate of the effectiveness of the present invention is that it is capable of generating a useful composite of a criminal in more than 50% of cases, when the witness has good recognition ability.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. Each and all of software, computer application programs, algorithms, patents, articles, reference, procedures, and methods described herein or cited herein are incorporated herein by reference.

What is claimed is:

1. A method of creating a satisfactory facial composite of a human face comprising the steps of:
   a) generating a set of facial composites;
   b) identifying a fittest facial composite of the set;
   c) combining probabilistically the fittest facial composite and another facial composite from the set to create an intermediate facial composite;
   d) placing the intermediate facial composite in the set; and
   e) performing steps b), c), and d) until the intermediate facial composite meets predetermined criteria for a satisfactory facial composite.

2. The method of claim 1 wherein the step a) of generating a set of facial composites comprises the step of randomly generating the set.

3. The method of claim 1 wherein the step a) of generating the set comprises the step of limiting a universe from which the set of facial composites is generated.

4. The method of claim 3 wherein the step of limiting the universe from which the set of facial composites is generated comprises the step of limiting sex of the facial composites.

5. The method of claim 3 wherein the step of limiting the universe from which the set of facial composites is generated comprises the step of limiting race of the facial composites.

6. The method of claim 1 wherein the step a) of generating a set of facial composites comprises the step of generating a set of unique strings of binary digits, each of the strings corresponding to a unique facial composite.

7. The method of claim 1 additionally comprising the step of rating each of the set of facial composites on a scale of fitness.

8. The method of claim 7 wherein the step of rating each of the set comprises the step of rating each of the facial composites on a scale of fitness to an observed human face.

9. The method of claim 7 wherein the step of rating each of the set comprises the step of rating each of the facial composites on a scale of fitness to a predetermined standard of a beautiful face.

10. The method of claim 7 wherein the step of rating each of the set comprises the step of measuring physiological responses of a user.

11. The method of claim 1 wherein the step c) of combining the fittest facial composite and another facial composite comprises the step of breeding two genotypes corresponding to the fittest facial composite and the another facial composite and another facial composite to generate an offspring genotype corresponding to the intermediate facial composite.

12. The method of claim 11 wherein the step of breeding two genotypes comprises the step of permitting crossover of genes between the two bred genotypes.

13. The method of claim 12 wherein the step of permitting crossover of genes comprises the step of probabilistically permitting crossover of genes between the two bred genotypes.

14. The method of claim 13 wherein the step of permitting crossover of genes comprises the step of probabilistically permitting crossover of genes between the two bred genotypes with a probability of approximately 0.24.

15. The method of claim 11 wherein the step of breeding two genotypes comprises the step of permitting mutation of genes within the two bred genotypes.

16. The method of claim 15 wherein the step of permitting mutation of genes comprises the step of probabilisticly permitting mutation of genes within the two bred genotypes.

17. The method of claim 16 wherein the step of permitting mutation of genes comprises the step of probabilistically permitting mutation of genes within the two bred genotypes with a probability of approximately 0.05.

18. The method of claim 1 additionally comprising the step of preventing further changes to a specified feature of the intermediate composite.

19. The method of claim 1 additionally comprising the step of modifying a specified feature of the intermediate composite.

20. The method of claim 1 wherein the step d) of placing the intermediate composite in the set comprises the step of placing the intermediate composite in the set only in instances in which the fitness of the intermediate composite is greater than the fitness of a least fit facial composite of the set.

21. The method of claim 20 wherein the step of placing the intermediate composite in the set additionally comprises the step of removing the least fit facial composite from the set.

22. The method of claim 1 additionally comprising the step f) of searching a database of facial composites for the intermediate facial composite.

23. An apparatus for creating a satisfactory facial composite of a human face comprising:
   means for generating a set of facial composites;

means for identifying a fittest facial composite of said set;

means for combining probabilistically said fittest facial composite and another facial composite from said set to create an intermediate facial composite;

means for placing said intermediate facial composite in said set; and means for determining when said intermediate facial composite meets predetermined criteria for a satisfactory facial composite.

24. The apparatus of claim 23 wherein said means for generating said set composites comprises means for randomly generating said set.

25. The apparatus of claim 23 wherein said means for generating said set comprises means for limiting a universe from which said set of facial composite is generated.

26. The apparatus of claim 25 wherein said means for limiting a universe from which said set of facial composites is generated comprises means for limiting sex of said facial composites.

27. The apparatus of claim 25 wherein said means for limiting a universe from which said set of facial composites is generated comprises means for limiting face of said facial composites.

28. The apparatus of claim 23 wherein said means for generating a set of facial composites comprises means for generating a set of unique strings of binary digits, each of said strings corresponding to a unique facial composite.

29. The apparatus of claim 23 additionally comprising means for rating each of said set of facial composites on a scale of fitness.

30. The apparatus of claim 29 wherein said means for rating each of said set comprises means for rating each of said facial composites on a scale of fitness to an observed human face.

31. The apparatus of claim 29 wherein said means for rating each of said set comprises means for rating each of said facial composites on a scale of fitness to a predetermined standard of a beautiful face.

32. The apparatus of claim 29 wherein said means for rating each of said set comprises means for measuring physiological response of a user.

33. The apparatus of claim 23 wherein said means for combining said fittest facial composite and another facial composite comprises means for breeding two genotypes corresponding to said fittest facial composite and said another facial composite to generate an offspring genotype corresponding to said intermediate facial composite.

34. The apparatus of claim 33 wherein said means for breeding two genotypes comprises means for permitting crossover of genes between said two bred genotypes.

35. The apparatus of claim 34 wherein said means for permitting crossover of genes comprises means for probabilistically permitting crossover of genes between said two bred genotypes.

36. The apparatus of claim 35 wherein said means for permitting crossover of genes comprises means for of probabilistically permitting crossover of genes between said two bred genotypes with a probability of approximately 0.24.

37. The apparatus of claim 33 wherein said means for breeding two genotypes comprises means for permitting mutation of genes within said two bred genotypes.

38. The apparatus of claim 37 wherein said means for permitting mutation of genes comprises means for probabilisticly permitting mutation of genes within said two bred genotypes.

39. The apparatus of claim 38 wherein said means for permitting mutation of genes comprises means for probabilistically permitting mutation of genes within said two bred genotypes with a probability of approximately 0.05.

40. The apparatus of claim 23 additionally comprising means for preventing further changes to a specified feature of said intermediate composite.

41. The apparatus of claim 23 additionally comprising means for modifying a specified feature of said intermediate composite.

42. The apparatus of claim 23 wherein said means for placing said intermediate composite in said set comprises means for placing said intermediate composite in said set only in instances in which said fitness of said intermediate composite is greater than said fitness of a least fit facial composite of said set.

43. The apparatus of claim 42 wherein said means for placing said intermediate composite in said set additionally comprises means for removing said least fit facial composite from said set.

44. The apparatus of claim 23 additionally comprising means for searching a database of facial composites for said intermediate facial composite.

* * * * *